United States Patent Office 3,471,409
Patented Oct. 7, 1969

3,471,409
GLASS LASERS FOR HIGH ENERGY APPLICATION
Haynes A. Lee, Jr., Sylvania, and Charles F. Rapp, Toledo, Ohio, assignors to Owens-Illinois, Inc., a corporation of Ohio
No Drawing. Filed Nov. 17, 1966, Ser. No. 595,000
Int. Cl. C09k 1/54; H01s 3/16
U.S. Cl. 252—301.4   18 Claims

ABSTRACT OF THE DISCLOSURE

A glass laser composition having high efficiency, low solarization and low light energy-thermal energy conversion characteristics contains the following ingredients in the approximate mol percent:

| Ingredient: | Mol percent |
| --- | --- |
| $SiO_2$ | 45–75 |
| $Al_2O_3$ | 0–8 |
| $Li_2O$ | 15–35 |
| $CaO$ | ½–30 |
| $Nd_2O_3$ | 1/10–2 |

The present invention relates to glass lasers for high energy applications and, more particularly, to glass laser compositions of the lithia-silica system that include substantial amounts of calcia, the composition exhibiting relatively high efficiency and low solarization in high power pulsed applications.

In the field of high power pulsed lasers, although it is important that the laser material be efficient from the standpoint of power output compared to power input, the efficiency of glass laser compositions has not been as high as desirable. Also, in high power pulsed laser applications, the problem of solarization has limited the use of some glass laser compositions.

It is an object of the present invention to provide a glass laser composition having relatively high efficiency in high energy applications.

It is an object of the present invention to provide a glass laser composition having relatively high efficiency in a high power pulsed laser and low solarization.

It is an object of the present invention to provide a glass laser composition in the lithia-silica system having substantial amounts of calcia, the composition having relatively high efficiency, and having a combination of desirable properties such as proper thermal expansion, and internal mechanisms for converting minimum pump light to thermal energy.

It is an object of the present invention to provide a glass laser composition and a method of making the same, the glass laser having high efficiency, low solarization, and a desirable low light energy-thermal energy conversion characteristic.

It is an object of the present invention to provide a high efficiency glass laser composition of the lithia-silica system containing substantial amounts of calcia, the composition comprising about 45 to 75 mole percent silica, about 15 to 35 mole percent lithia, about ½ to 30 mole percent calcia, about 0.1 to 2 mole percent neodymium oxide, and about 1/10 to ½ mole percent cerium oxide, the total amount of lithia plus calcia not being substantially higher than about 50 mole percent.

These and other objects will become apparent from the specification that follows and the appended claims.

The present invention provides an improved glass laser composition of the lithia-silica system containing substantial amounts of calcia and being doped with neodymium oxide, the glass laser being greatly improved in efficiency in high energy applications and better than any previously known glass laser.

In general, the high efficiency, low solarization glass laser compositions of the present invention contain the following ingredients in ranges expressed in approximate mole percent and weight percent corresponding very roughly to said mole percent:

| Ingredients | Mole Percent | Weight Percent |
| --- | --- | --- |
| $SiO_2$ | 45–75 | 50–80 |
| $Al_2O_3$ | 0–8 | 0–15 |
| $Li_2O$ | 15–35 | 8–20 |
| $CaO$ | ½–30 | ½–30 |
| $Nd_2O_3$ | 1/10–2 | ½–8 |

The present invention is directed to a high efficiency neodymium oxide-doped glass laser host material of the lithia-silica system containing substantial amounts, i.e., at least ½ up to 30 mole percent, of calcia. While applicants do not wish to be bound by any theory, the improved performance of lithia-silica glasses may result from the small size of the lithium ion and its place in the glass structure. The lithium ion is small enough to be six-fold coordinated in the structure and each oxygen atom can contribute a greater proportion of its energy to its bond with lithium than can an oxygen atom that is part of an eight-fold coordination. This will polarize the oxygen ion to a greater extent which will then give a greater polarization to the neodymium ion. The introduction of calcium ions into the glass structure apparently further enhances the performance of the lithia-silica glasses to provide high efficiency laser host materials.

As previously indicated, as low an amount of calcia as about ½ mole percent provides some improvement in the property of the glass to convert input energy to output energy, the resultant glass laser having high efficiency and, yet, very little solarization. Generally, calcia can be used in an amount up to about 29 or 30 mole percent and still obtain a good glass laser material, providing that the total amount of calcia lithia does not exceed about 50 mole percent.

The preferred and optimum glass laser compositions are set forth below, each ingredient being listed in its approximate mole percent:

| Ingredients | Preferred | Optimum |
| --- | --- | --- |
| $SiO_2$ | 48–65 | 49–62 |
| $Al_2O_3$ | 0–8 | 2–5 |
| $Li_2O$ | 20–30 | 25–30 |
| $CaO$ | 5–25 | 8–22 |
| $Nd_2O_3$ | 0.1–2 | 0.1–1 |
| $CeO_2$ | 0.1–0.3 | 0.1–0.2 |

As to the amount of silica present in the compositions, when the lower limit of silica is below about 45 mole percent, the composition tends to be somewhat unstable in that it is more difficult to handle and is more likely to devitrify. When the amount of silica is about 75 mole percent or more, the lasing efficiency drops off, particularly where either the lithia or calcia is at its minimum.

Where the calcia is at its minimum or near-minimum level, generally about 24 mole percent of lithia is needed. When the lithia content is near its minimum of 15 mole percent, at least about 10 mole percent of calcia is needed to provide a substantial improvement in lasing efficiency.

Optionally, up to 8 mole percent of alumina can be used, it generally being preferred that, when used, at least about 2 mole percent be employed to help provide the unusual combination of properties of the laser glass including chemical durability, high efficiency and low solarization.

As previously indicated, generally neodymium oxide is used in amounts of about 0.1 mole percent to as high as about 2 mole percent or more, with the preferred range being from about 0.1 to 1 mole percent. Generally, it is highly preferred to have at least 0.1 mole percent $Nd_2O_3$ in the composition, the optimum amount being usually from about 0.1 to 0.8 or 1.0 mole percent.

Generally, the amount of the solarization-inhibiting oxide, that is preferably $CeO_2$, employed is about $1/10$ to $1/2$ or more mole percent. The use of at least about $1/10$ mole percent $CeO_2$ helps materially to inhibit solarization which darkens the rod and results in a substantial loss in efficiency. Preferably, the amounts of $CeO_2$ is kept relatively low so that other desirable properties of the glass laser will not be affected. In some cases, other inhibiting oxides such as antimony and titania can be substituted for all or part of the CeO, but preferably at least 50 mole percent of the inhibiting oxides present is $CeO_2$. It is understood that the cerium oxide present in the glasses is reported as $CeO_2$ but that the oxide is usually present both as $CeO_2$ and $Ce_2O_3$ with the $Ce_2O_3$ probably being the major portion.

The following examples are intended to illustrate the present invention and not to limit the same.

EXAMPLE 1

A melt was prepared by mixing reagent grade raw materials to form a glass melt of high optical quality having the following composition in mole percent, and, for convenience, also weight percent:

| Ingredients | Mole Percent | Weight Percent |
| --- | --- | --- |
| $SiO_2$ | 60 | 66.29 |
| $Al_2O_3$ | 2.5 | 4.69 |
| $Li_2O$ | 27.5 | 15.11 |
| CaO | 10 | 10.31 |
| $Nd_2O_3$ | 0.5 | 3.09 |
| $CeO_2$ | 0.16 | 0.51 |

Rods of about $1/2$ inch diameter and 4 inches in length were prepared from the melt and the ends of the rods were polished to a close tolerance.

The rod was placed in a cylindrical cavity with a highly polished aluminum interior surface. A PEK XE5–2153–2 helical xenon flashlamp (PEK Laboratory, Sunnyvale, Calif.) was used. The energy to the lamp was supplied from power supply containing capacitors that are chargeable to produce a constant capacitance, the power supply being a Lear Siegler, Inc. Energy Storage Unit and Control Power Unit. In this test the capacitance was constant at 200 fd and the voltage varied from about 2.5 to 4.0 kv. In this test, the above-described glass laser rod exhibited a 35 percent greater incremental energy conversion efficiency than any known commercial laser glass.

In addition to the above-described significant improvement in the conversion of energy, the rods did not change color or otherwise degrade by exposure to the intense light of the xenon flashlamp pumping unit even after many pulses.

EXAMPLE 2

A melt was prepared in a manner described in Example 1 to form a glass melt having the following approximate composition:

| Ingredients | Mole Percent | Weight Percent |
| --- | --- | --- |
| $SiO_2$ | 50 | 55.65 |
| $Al_2O_3$ | 2.5 | 4.72 |
| $Li_2O$ | 27.5 | 15.22 |
| CaO | 20 | 20.78 |
| $Nd_2O_3$ | 0.5 | 3.12 |
| $CeO_2$ | 0.16 | 0.51 |

Rods were prepared from the melt and tested for efficiency in a high power pulsed test system as described in Example 1. The rods were substantially improved in incremental energy conversion efficiency over commercially available glass rods.

The rods likewise did not solarize (change color) when exposed to the intense light of the pumping flashlamp.

EXAMPLE 3

A melt was prepared and rods made therefrom as described in Example 1, the melt having the following approximate composition:

| Ingredients | Mole Percent | Weight Percent |
| --- | --- | --- |
| $SiO_2$ | 50.84 | 56.23 |
| $Al_2O_3$ | 2.12 | 3.98 |
| $Li_2O$ | 23.31 | 12.82 |
| CaO | 23.17 | 23.92 |
| $Nd_2O_3$ | 0.42 | 2.62 |
| $CeO_2$ | 0.14 | 0.43 |

The rods were tested as described in Example 1 and exhibited relatively high efficiency and had little tendency to solarize.

What is claimed is:

1. A glass laser composition comprising the following ingredients in approximate mole percentages:

| Ingredient: | Percent |
| --- | --- |
| $SiO_2$ | 45 to 75 |
| $Li_2O$ | 15 to 35 |
| CaO | $1/2$ to 30 |
| $Nd_2O_3$ | $1/10$ to 2 |
| $Al_2O_3$ | 0 to 8 | where the total amount of $Li_2O$ and CaO is not substantially higher than about 50 mole percent; when the $Li_2O$ is present at about 15 mole percent, the amount of CaO is at least about 10 mole percent; and when the CaO content is at about $1/2$ mole percent, the amount of $Li_2O$ is at least about 24 mole percent.

2. A glass laser composition as defined in claim 1 in which the following ingredients are present in approximate mole percent:

| Ingredients: | Percent |
| --- | --- |
| $SiO_2$ | 48–65 |
| $Li_2O$ | 20–30 |
| CaO | 5–25 |
| $Nd_2O_3$ | 0.1–2 |
| $Al_2O_3$ | 0–8 |

3. A glass laser composition as defined in claim 1 in which the following ingredients are present in approximate mole percent:

| Ingredients: | Percent |
| --- | --- |
| $SiO_2$ | 49–62 |
| $Li_2O$ | 25–30 |
| CaO | 8–22 |
| $Nd_2O_3$ | 0.1–1 |
| $Al_2O_3$ | 2–5 |

4. A composition as defined in claim 1 containing a small but effective amount of $CeO_2$.

5. A glass laser composition as defined in claim 4 in which the following ingredients are present in approximate mole percent:

| Ingredients: | Percent |
| --- | --- |
| $SiO_2$ | 48–65 |
| $Li_2O$ | 20–30 |
| CaO | 5–25 |
| $Nd_2O_3$ | 0.1–2 |
| $CeO_2$ | 0.1–0.3 |
| $Al_2O_3$ | 0–8 |

6. A glass laser composition as defined in claim 4 in which the following ingredients are present in approximate mole percent:

| Ingredients: | Percent |
| --- | --- |
| $SiO_2$ | 49–62 |
| $Li_2O$ | 25–30 |
| CaO | 8–22 |
| $Nd_2O_3$ | 0.1–1 |
| $CeO_2$ | 0.1–0.2 |
| $Al_2O_3$ | 2–5 |

7. A composition as defined in claim 1 in which a solarization inhibiting oxide is present.

8. A composition as defined in claim 7 in which the solarization inhibiting oxide is antimony oxide.

9. A compostion as defined in claim 7 in which the solarization inhibiting oxide is titanium dioxide.

10. A laser component comprising a neodymium oxide-doped glass having the following approximate composition:

| Ingredients: | Mole percent |
| --- | --- |
| $SiO_2$ | 60 |
| $Al_2O_3$ | 2.5 |
| $Li_2O$ | 27.5 |
| $CaO$ | 10 |
| $Nd_2O_3$ | 0.5 |
| $CeO_2$ | 0.16 |

11. A laser component comprising a neodymium oxide-doped glass having the following approximate composition:

| Ingredients: | Mole percent |
| --- | --- |
| $SiO_2$ | 50 |
| $Al_2O_3$ | 2.5 |
| $Li_2O$ | 27.5 |
| $CaO$ | 20 |
| $Nd_2O_3$ | 0.5 |
| $CeO_2$ | 0.16 |

12. A laser component comprising a glass composition as defined in claim 1 in which the following ingredients are present:

| Ingredients: | Approximate mole percent |
| --- | --- |
| $SiO_2$ | 50.8 |
| $Al_2O_3$ | 2.1 |
| $Li_2O$ | 23.3 |
| $CaO$ | 23.2 |
| $Nd_2O_3$ | 0.42 |
| $CeO_2$ | 0.14 |

13. A laser component comprising a glass rod of the composition defined in claim 1.

14. A laser component comprising a glass rod of the composition defined in claim 4.

15. A method of making a relatively low solarization, high efficiency glass laser component comprising the steps of (1) preparing a melt from a composition having the following ingredients in approximate mole percentages:

| Ingredients: | Percent |
| --- | --- |
| $SiO_2$ | 45 to 75 |
| $Li_2O$ | 15 to 35 |
| $CaO$ | ½ to 30 |
| $Nd_2O_3$ | 1/10 to 2 |
| $CeO_2$ | 1/10 to ½ |
| $Al_2O_3$ | 0 to 8 | where the total amount of $Li_2O$ and $CaO$ is not substantially higher than about 50 mole percent; when the $Li_2O$ is present at about 15 mole percent, the amount of $CaO$ is at least about 10 mole percent; and when the $CaO$ content is at least about ½ mole percent, the amount of $Li_2O$ is at least about 24 mole percent, and (2) preparing a rod from the melt to obtain the relatively high efficiency glass laser component.

16. A method as defined in claim 15 in which the melt has the following approximate composition:

| Ingredients: | Mole percent |
| --- | --- |
| $SiO_2$ | 60 |
| $Al_2O_3$ | 2.5 |
| $Li_2O$ | 27.5 |
| $CaO$ | 10 |
| $Nd_2O_3$ | 0.5 |
| $CeO_2$ | 0.16 |

17. A method as defined in claim 15 in which the melt has the following approximate composition:

| Ingredients: | Mole percent |
| --- | --- |
| $SiO_2$ | 50 |
| $Al_2O_3$ | 2.5 |
| $Li_2O$ | 27.5 |
| $CaO$ | 20 |
| $Nd_2O_3$ | 0.5 |
| $CeO_2$ | 0.16 |

18. A neodymium oxide-doped glass laser composition containing small but effective solarization-inhibiting amounts of cerium oxide, the composition comprising the following ingredients:

| Ingredients: | Approximate mole percent |
| --- | --- |
| $SiO_2$ | 49–62 |
| $Li_2O$ | 25–30 |
| $CaO$ | 8–22 |

References Cited
UNITED STATES PATENTS

| | | | |
| --- | --- | --- | --- |
| 3,208,009 | 9/1965 | Etzel et al. | 252—301.4 |
| 3,270,290 | 8/1966 | Maurer | 252—301.4 |
| 3,384,597 | 5/1968 | DePaolis et al. | 252—301.4 |

TOBIAS E. LEVOW, Primary Examiner

R. D. EDMONDS, Assistant Examiner

U.S. Cl. X.R.

106—52; 330—4.3; 331—94.5

PO-1050
(5/69)

UNITED STATES PATENT OFFICE
CERTIFICATE OF CORRECTION

Patent No. 3,471,409      Dated October 7, 1969

Inventor(s) Haynes A. Lee, Jr. and Charles F. Rapp

It is certified that error appears in the above-identified patent and that said Letters Patent are hereby corrected as shown below:

Column 1, line 13, insert a comma --,-- after "solarization"
Column 2, line 37, insert --and-- between "calcia" and "lithia".
Column 3, line 12, "CeO" should be --CeO$_2$--. Column 5, line 5, "compostion" should be --composition--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents